United States Patent [19]

Kurihara et al.

[11] Patent Number: 4,862,362
[45] Date of Patent: Aug. 29, 1989

[54] APPARATUS FOR GENERATING ACCELERATION SIGNAL FOR BACKUP

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 111,227

[22] Filed: Oct. 22, 1987

[30] Foreign Application Priority Data

Oct. 24, 1986 [JP] Japan .................. 61-251844
Oct. 24, 1986 [JP] Japan .................. 61-251845

[51] Int. Cl.⁴ .................. G06F 15/50; G06G 7/70
[52] U.S. Cl. .................. 364/424.1; 74/866
[58] Field of Search .................. 364/424.1; 74/866; 192/0.042, 0.09

[56] References Cited

U.S. PATENT DOCUMENTS 4,656,588  4/1987  Kubo .................. 364/426
4,667,541  5/1987  Shimaoka et al. .................. 364/424.1
4,714,145  12/1987  Kurihara et al. .................. 192/0.052
4,747,056  5/1988  Yamamoto et al. .................. 364/424.1

FOREIGN PATENT DOCUMENTS 60-11756  1/1985  Japan .

Primary Examiner—Eugene R. LaRoche
Assistant Examiner—Nathan W. McCutcheon
Attorney, Agent, or Firm—Pollock, Vande Sande & Priddy

[57] ABSTRACT

A backup acceleration signal generator for vehicles having, for example, an automatic transmission operating in response to a signal indicating the amount of acceleration, has a signal generator for producing a backup operation. The backup signal is too small to start the control operation for starting the vehicle and is applied to the automatic transmission in accordance with the braking condition of the vehicle or the operating condition of the automatic transmission. The apparatus supplies the backup signal to the automatic transmission when braking power is applied to the vehicle or the vehicle is in the parked condition, so that the vehicle is prevented from starting automatically when the backup operation starts due to the occurrence of an abnormality of the acceleration signal.

26 Claims, 6 Drawing Sheets

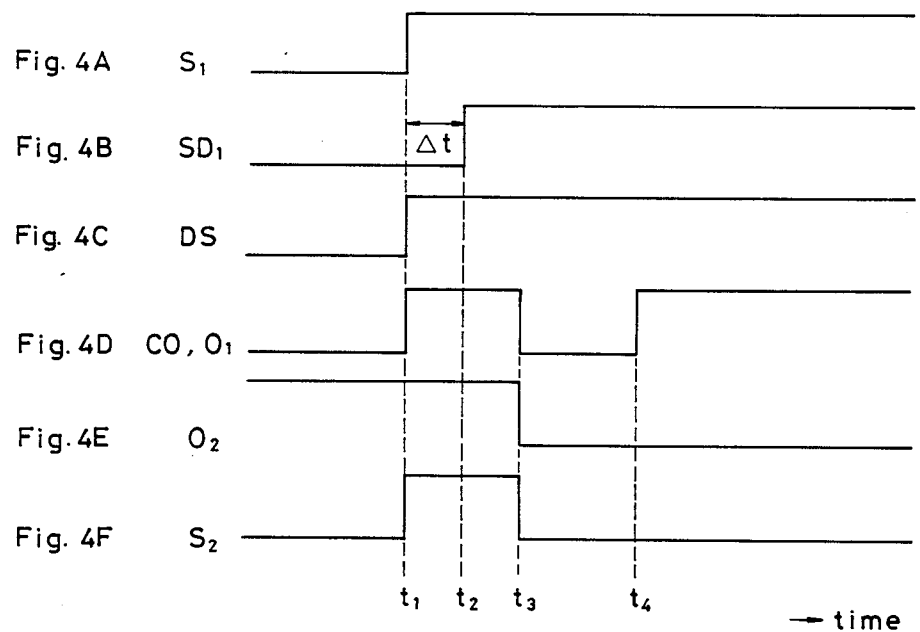
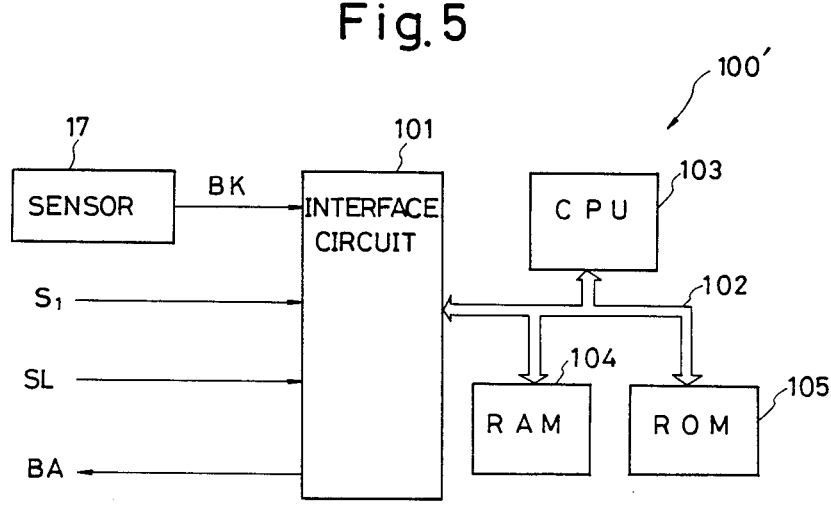

APPARATUS FOR GENERATING ACCELERATION SIGNAL FOR BACKUP

TECHNICAL FIELD

The present invention relates to a backup acceleration signal generating apparatus, and more particularly to an apparatus for use in a vehicle having an automatic transmission system controlled in accordance with the amount of the operation of an accelerator pedal. Specifically a backup acceleration signal is generated showing the amount of operation of an accelerator pedal which is used instead of an actual acceleration signal showing the amount of operation of an accelerator pedal at each instant. This backup signal is used when the generator for producing the actual acceleration signal breaks down or malfunctions.

BACKGROUND OF THE INVENTION

In the case of a vehicle provided with an automatic transmission system controlled in response to the amount of operation of an accelerator pedal, the control of the vehicle during driving may become difficult when the actual acceleration signal representing the amount of operation of the accelerator pedal at each instant cannot be obtained correctly because of trouble with an acceleration sensor or the like. To eliminate this problem, there has been proposed a backup system in which a signal representing a predetermined fixed amount of operation of the accelerator pedal is used instead of the actual acceleration signal when trouble arises with the acceleration sensor (Japanese Patent Application Public Disclosure No. Sho 60-75735).

The backup signal of the proposed system is of fixed value and there is thus no problem in the case where the vehicle continues to run at a given speed. However, it becomes impossible to stop the vehicle, even when the brake pedal is depressed by the driver. The engine speed may become extremely high when the transmission is shifted to neutral. Furthermore, when, for example, the backup acceleration signal is used in place of the acceleration signal when the vehicle is stopped, a very dangerous condition may arise in which the vehicle will start independently of the driver's intention.

SUMMARY OF THE INVENTION

It is an object of the present invention to provide an improved backup acceleration signal generating apparatus for vehicles which eliminates the disadvantages of the prior art described above.

It is another object of the present invention to provide a backup acceleration signal generating apparatus which is capable of producing a backup acceleration signal matched to the driving condition of the vehicle.

It is a further object of the present invention to provide a backup acceleration signal generating apparatus which is capable of producing an appropriate backup acceleration signal matched to the operating condition of a brake system of the vehicle.

It is a still further object of the present invention to provide a backup acceleration signal generating apparatus for an automatic transmission system, which is capable of providing a backup acceleration signal in such a way that the vehicle can be prevented from starting independently of the driver's intention when using the backup acceleration signal.

According to the present invention, in an apparatus for generating a backup acceleration signal for a vehicle having an automatic transmission controlled in accordance with the amount of operation of an accelerating member, the amount of acceleration represented by the backup acceleration signal is determined in accordance with the operating condition of the vehicle and is sufficiently low that it cannot start the vehicle.

As a detector for detecting the operating condition of the vehicle, there is provided means for producing a brake signal showing the operating/inoperating state of the brake system of the vehicle. The apparatus further comprises a first signal generating means for providing a first signal representing an amount of acceleration by which the vehicle cannot be started in the case where the brake system is in an operating state. This signal makes it possible to prevent the vehicle from being started upon the application of the backup acceleration signal at the time the braking power is effected. When the vehicle is running, a second signal representing a prescribed amount of acceleration is produced, which is capable of maintaining the vehicle running. When it is detected from the brake signal that the brake system has changed from its operating state to its inoperative state, there is produced a third signal which indicates an acceleration magnitude that changes from a low amount not capable of starting the vehicle to a large amount capable of maintaining the vehicle running.

Thus, in the case where trouble arises with the acceleration sensor, if the brake system is in the operating state, the first signal is used for controlling the operation of the vehicle. If, for example, the braking power is released in this case, the vehicle can start under application of the third signal, enabling the vehicle to be started and accelerated. Thus, since the backup acceleration signal is determined in accordance with the operating condition of the braking system, it becomes possible to provide backup for smooth stopping and starting operation of the vehicle.

In another backup acceleration signal generating apparatus according to the present invention, the apparatus comprises determining means for discriminating whether or not the automatic transmission system is in a gear set state and the clutch is in a disengaged state, produces a backup acceleration signal representing a low acceleration magnitude which is not capable of starting the vehicle when the automatic transmission system is in a gear set state and the clutch is disengaged. In this apparatus, the low acceleration magnitude may be set to correspond to the release condition of the accelerator pedal. Therefore, even when the backup acceleration signal is employed in the condition stated above because of some trouble in the acceleration detection system, starting of the vehicle independently of the driver's intention can be prevented. Thus, a highly safe backup system can be provided since the vehicle will not start automatically even if the acceleration detection system malfunctions when the driver is not in the vehicle.

The invention will be better understood and other objects and advantages thereof will be more apparent from the following detailed description of preferred embodiments made with reference to the accompanying drawings.

BRIEF DESCRIPTION OF THE DRAWINGS

FIGS. 4A to 4F are waveform diagrams of signals in FIG. 3;

FIG. 5 is a block diagram showing a modification of the backup acceleration signal generator shown in FIG. 1.

DESCRIPTION OF PREFERRED EMBODIMENTS

Figure 1:
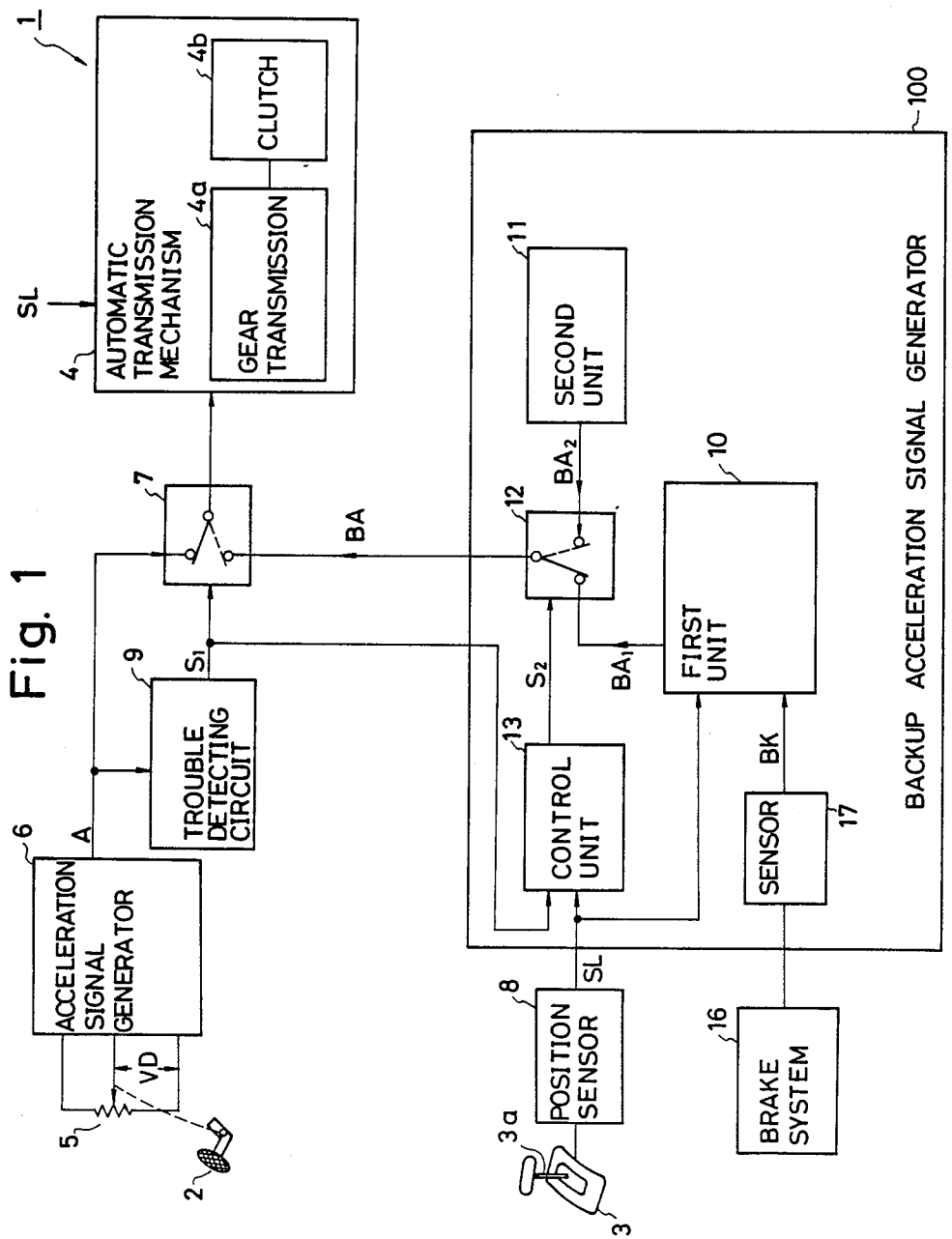
FIG. 1 is a block diagram showing an embodiment of an automatic transmission system for vehicles employ

FIG. 1 shows a block diagram of one embodiment of a vehicle automatic transmission system equipped with a backup acceleration signal generating apparatus according to the present invention. The automatic transmission system has an automatic transmission mechanism 4 operated in accordance with data showing the amount of operation of an accelerator pedal 2 and data showing the position of a select lever 3a of a selector 3. The accelerator pedal 2 is connected with a potentiometer 5 by which the amount of operation of the accelerator pedal 2 is converted into a voltage signal. A detection voltage VD from the potentiometer 5 is applied to an acceleration signal generator 6 which produces an actual acceleration signal A showing the amount of operation of the accelerator pedal 2 at each instant. The actual acceleration signal A is supplied through a first switch 7 to the automatic transmission mechanism 4 having a gear transmission 4a and a clutch 4b.

The selector 3 is connected with a position sensor 8 for producing a position signal SL showing the position of the select lever 3a and the position signal SL is supplied to the automatic transmission mechanism 4, which is of wellknown design, and to a backup acceleration signal generator 100 according to the present invention.

The backup acceleration signal generator 100 is for generating a backup acceleration signal BA which is used instead of the actual acceleration signal A when the actual acceleration signal A cannot be obtained normally from the acceleration signal generator 6. The backup acceleration signal BA is supplied to the first switch 7 which is controlled by a switch control signal $S_1$ from a trouble detecting circuit 9. The trouble detecting circuit 9 is responsive to the actual acceleration signal A and discriminates whether or not the actual acceleration signal A is normally produced from the acceleration signal generator 6. The switch control signal $S_1$ is produced from the trouble detecting circuit 9 when an abnormal condition of the actual acceleration signal A is detected thereby, and the first switch 7 is switched over from the state shown by the solid line to the state shown by the broken line when an abnormal condition is detected.

More specifically, the actual acceleration signal A is selected by the first switch 7 and is supplied to the automatic transmission mechanism 4 when the actual acceleration signal A is produced normally. In contrast, the backup acceleration signal BA is selected by the first switch 7 and is supplied to the automatic transmission mechanism 4 when the actual acceleration signal A is not produced normally.

The automatic transmission mechanism 4 is responsive to the position signal SL and the signal selected by the first switch 7 and the required gear shift operation is carried out.

The backup acceleration signal generator 100 has a first unit 10 for producing a first backup acceleration signal $BA_1$ and a second unit 11 for producing a second backup acceleration signal $BA_2$. The first and second backup acceleration signals $BA_1$ and $BA_2$ are applied to a second switch 12 and one or the other of the two signals $BA_1$ and $BA_2$ is selected as the backup accelerator signal BA by the second switch 12. The switching operation of the second switch 12 is controlled by a switch control signal $S_2$, which is produced by a control unit 13 to which the switch control signal $S_1$ and the position signal SL are supplied.

Figure 2:
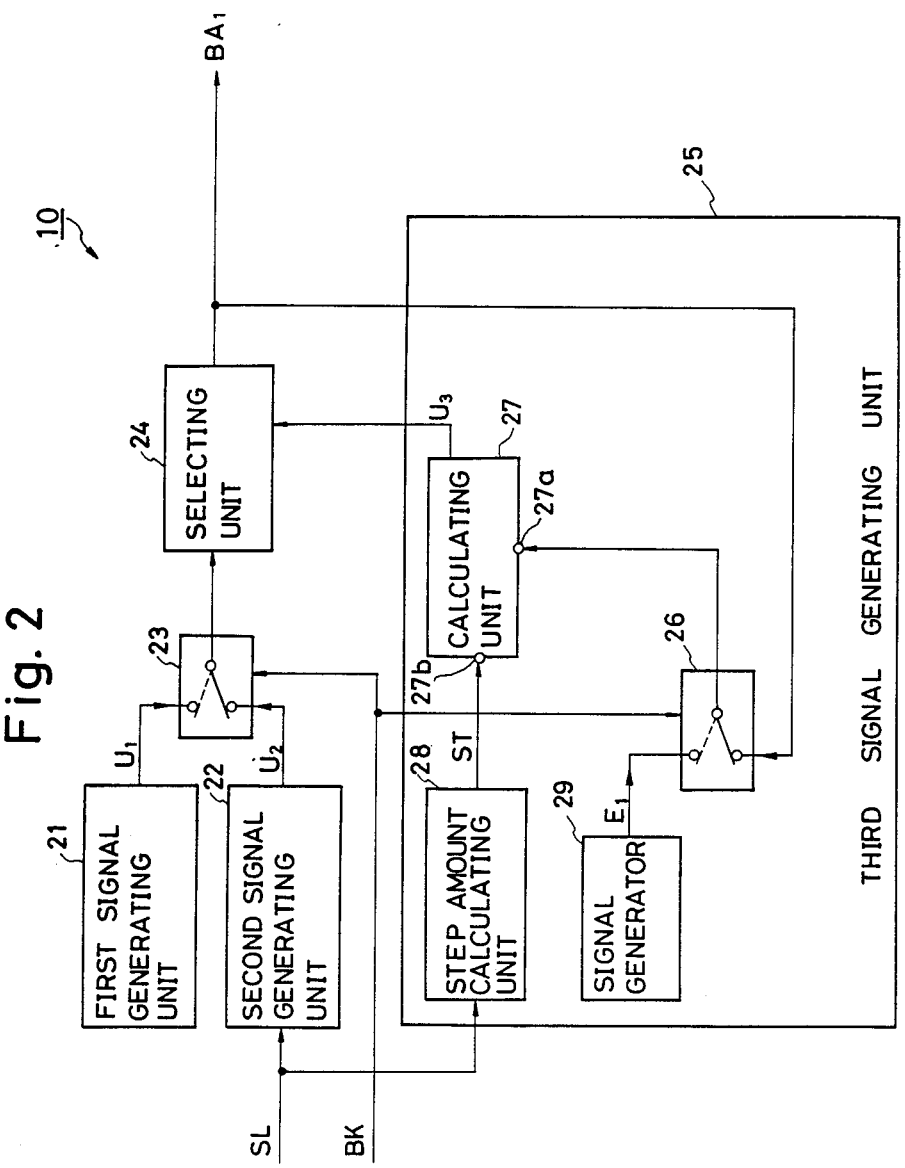
- FIG. 2 is a detailed block diagram of a first unit shown in FIG. 1.

An explanation of the first unit 10 will now be given in conjunction with FIG. 2. The first unit 10 has a first signal generating unit 21 for producing a first signal $U_1$ corresponding to the actual acceleration signal A for the case where the accelerator pedal 2 is released (e.g. the amount of the acceleration is zero), and a second signal generating unit 22 for producing a second signal $U_2$ showing a predetermined amount of acceleration necessary for maintaining the vehicle running.

In this embodiment, the second signal generating unit 22 is arranged in such a way that a signal representing the backup amount of acceleration predetermined in accordance with the position of the selector 3 is produced as the second signal $U_2$ in response to the position signal SL. That is, a fixed amount of acceleration determined in accordance with the position of the selector 3 is used for the backup operation using the second signal $U_2$. As a result, it is possible to realize fine backup operation matched to the position of the selector 3.

The first and second signals $U_1$ and $U_2$ are forwarded to a switching element 23, whose switching operation is controlled by a brake signal BK produced by a brake sensor 17 shown in FIG. 1. The brake sensor 17 is connected with a brake system 16 and detects whether or not the brake system 16 is in the operating condition. The brake signal BK shows the result of this detection. The switching element 23 is switched over as shown by the broken line in FIG. 2 in response to the brake signal BK when the brake system 16 is providing braking power, and the first signal $U_1$ is selected by the switching element 23. On the other hand, the switching element 23 is switched over as shown by the solid line in FIG. 2 in response to the brake signal BK when the brake system 16 does not provide braking power, and the second signal $U_2$ is selected by the switching element 23. The selected signal from the switching element 23 is applied to a selecting unit 24.

A third signal generating unit 25 is responsive to the brake signal BK and produces a third signal $U_3$ indicating an amount of acceleration which changes with the passage of time after the braking power applied to the vehicle by the brake system is released from a small amount not capable of starting the vehicle to a predetermined larger amount. The small amount mentioned above may be the amount of acceleration indicated by the actual acceleration signal A in the case where the accelerator pedal 2 is released (not depressed).

The signal generator 25 generates an initial amount signal $E_1$ showing the small amount or the start amount mentioned above, and the initial amount signal $E_1$ may be an upper limit amount above which the acceleration is capable of making the vehicle start. The initial amount signal $E_1$ is applied to a switching element 26 to which the first backup acceleration signal $BA_1$ from the selecting unit 24 is applied, and the switching element 26 is also switched over in response to the brake signal BK. The switching element 26 is switched over to the state shown by the solid line to select the first backup acceleration signal $BA_1$ when the braking power is not provided to the vehicle by the brake system 16. On the other hand, the switching element 26 is switched over to the state shown by the broken line to select the initial amount signal $E_1$ when the braking power is effected to the vehicle by the brake system 16. The output from the switching element 26 is applied to a first terminal 27a of a calculating unit 27.

The calculating unit 27 functions to repeatedly carry out a calculation for adding an increment amount $\Delta A$ of acceleration shown by a signal applied to a second terminal 27b of the calculating unit 27 to the amount of acceleration shown by the signal applied to the first terminal 27a at predetermined time intervals. A step amount calculating unit 28 is responsive to the position signal SL and the signal showing the increment amount $\Delta A$ of acceleration is produced as a step amount signal ST, which is applied to the second terminal 27b. The increment amount $\Delta A$ shown by the stepaamount signal ST is determined in accordance with the position of the selector at each instant. The output from the calculating unit 27 is produced as the third signal $U_3$, which is supplied to the selecting unit 24.

The selecting unit 24 compares the magnitudes of the signal from the switching element 23 and the third signal $U_3$, and outputs the smaller of the two signals as the first backup acceleration signal $BA_1$ at that time.

The operation of the first unit 10 will now be explained.

Both of the switching elements 23 and 26 are switched over as shown by the solid lines when no braking power is effected on the vehicle by the brake system 16. Therefore, the second signal $U_2$ is selected by the switching element 23 and is supplied to the selecting unit 24. On the other hand, in the third signal generating unit 25, the calculating unit 27 receives through its second terminal 27b the step amount signal ST showing the increment amount $\Delta A$ of acceleration and the first backup acceleration signal $BA_1$ is applied through the switching element 26 to the first terminal 27a of the calculating unit 27.

Accordingly, when the result of adding the increment amount $\Delta A$ shown by the step amount signal ST to the amount of acceleration shown by the first backup acceleration signal $BA_1$ is smaller than that shown by the second signal $U_2$, the third signal $U_3$ is selected by the selecting unit 24 and is output as the updated first backup acceleration signal $BA_1$. Thus, the amount of acceleration shown by the third signal $U_3$ is stepwise increased in the manner indicated above, and the second signal $U_2$ is derived as a first backup acceleration signal $BA_1$ when $U_3 > U_2$. As will be understood from the above explanation, the magnitude of the third signal $U_3$ does not exceed the magnitude of the sum of the second signal $U_2$ and the step amount signal ST. That is, when the brake system 16 is in an inoperative state, the second signal $U_2$ is output as the first backup acceleration signal $BA_1$ in the stationary state of the first unit 10 and the vehicle running speed is maintained in accordance with the position of the selector 3.

On the other hand, both of the switching elements 23 and 26 are switched over as shown by the broken lines when the braking power is effected on the vehicle by the brake system 16. Thus, the first signal $U_1$ is selected by the switching element 23 and is applied to the selecting unit 24. In the third signal generating unit 25, the initial amount signal $E_1$ is selected by the switching element 26 instead of the first backup acceleration signal $BA_1$ and is applied to the first terminal 27a of the calculating unit 27. Therefore, the maximum magnitude of the third signal $U_3$ is equal to the result of the addition of the initial amount signal $E_1$ and the step amount signal ST. As a result, the first backup acceleration signal $BA_1$ becomes equal to the first signal $U_1$, so that the vehicle cannot start, and the stopped state of the vehicle can be maintained by the brake system 16.

In the condition described above, when the braking power provided by the brake system 16 is released, the switching elements 23 and 26 are switched over as shown by the solid lines. The switching operation causes the third signal generating unit 25 to produce a third signal $U_3$ which is equal to the sum of the amount of acceleration of the step amount signal ST and that of the initial amount signal $E_1$. Since $U_3 < U_2$ in this case, the third signal $U_3$ is selected as the first backup acceleration signal $BA_1$ by the selecting unit 24 and the first backup acceleration signal $BA_1$ from the selecting unit 24 is applied through the switching element 26 to the first terminal 27a of the calculating unit 27. As described above, the output from the calculating unit 27 is stepwise increased with the passage of time and the third signal $U_3$ is output as the first backup acceleration signal $BA_1$ until the relationship of $U_3 > U_2$ is established. Consequently, the magnitude of the first backup acceleration signal $BA_1$ is stepwise increased to the magnitude of the second signal $U_2$, and the control for starting the vehicle is smoothly carried out after the braking power effected by the brake system 16 is removed.

As will be understood from the above description, when the value of $\Delta A$ is set at more than $U_2 - U_3$ at the time the braking power effected by the brake system 16 is removed, it is possible to obtain two kinds of backup acceleration signals: one for maintaining the vehicle running when the brake system 16 is in operative condition and another of a small level insufficient to make the vehicle start.

Referring to FIG. 1, the second unit 11 is for producing the second backup acceleration signal $BA_2$ showing a small fixed amount of acceleration (e.g. corresponding to the released condition of the accelerator pedal 2) of a level incapable of causing the control operation for starting the vehicle in the automatic transmission mechanism 4. The second backup acceleration signal $BA_2$ is selected by the second switch 12 instead of the first backup acceleration signal $BA_1$ when the control unit 13 detects that the gear of the automatic transmission mechanism 4 is set and the clutch is disengaged.

Figure 3:
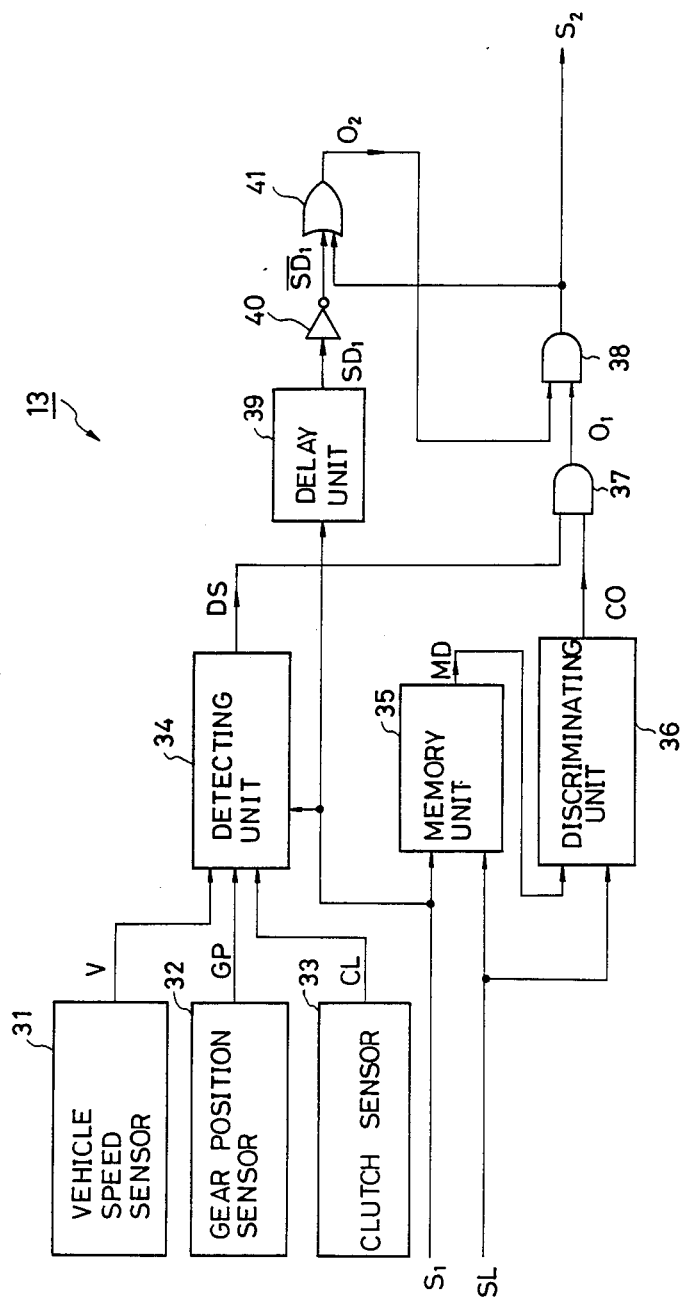
FIG. 3 is a detailed block diagram of a control unit 5 shown in FIG. 1.

An explanation of the control unit 13 will now be given in conjunction with FIG. 3. The control unit 13 has a vehicle speed sensor 31 for producing a vehicle speed signal V showing the speed of the vehicle, a gear position sensor 32 for producing a gear position signal GP representing the position to which the gear of the transmission 4a is shifted and a clutch sensor 33 for producing a clutch signal CL representing the engaged/disengaged state of the clutch 4b in the automatic transmission mechanism 4. The vehicle speed signal V, the gear position signal GP and the clutch signal CL are applied to a detecting unit 34 to which the switch control signal $S_1$ is applied. The detecting unit 34 is responsive to the switch control signal $S_1$ and discriminates whether or not the gear is set in the transmission, the clutch is disengaged and the vehicle speed is zero at the time the level of the switch control signal $S_1$ changes from low to high. The level of the output signal DS from the detecting unit 34 is latched at high level when the gear is set in the transmission, the clutch is disengaged and the vehicle speed is zero.

The control unit 13 further comprises a memory unit 35 which is responsive to the switch control signal $S_1$ and the position signal SL and stores the position of the select lever 3a at the time the level of the switch control signal $S_1$ changes from low to high. Output data MD showing the content of the memory unit 35 is applied to a discriminating unit 36 to which the position signal SL is also applied. The discriminating unit 36 discriminates whether or not the position of the select lever 3a at that time is the same as the position indicated by the output data MD, and the level of the output signal CO of the discriminating unit 36 become high when the two positions are identical.

The output signals DS and CO are applied to an AND gate 37 and the output signal $O_1$ of the AND gate 37 is input to one input terminal of another AND gate 38. The switch control signal $S_1$ is input to a delay unit 39 for delaying the switch control signal $S_1$ by a predetermined time $\Delta t$ and the delayed switch control signal $S_1$ is derived as a delay switch control signal $SD_1$. The level of the delay switch control signal $SD_1$ is inverted by means of an inverter 40 and the inverted signal $\overline{SD_1}$ is applied to one input terminal of an OR gate 41 having another input terminal to which the output signal from the AND gate 38 is input. The output signal $O_2$ from the OR gate 41 is input to another input terminal of the AND gate 38 and the output signal of the AND gate 38 is derived as the switch control signal $S_2$.

The operation of the control unit 13 will be described with reference to FIGS. 4A to 4F. Assuming that the actual acceleration signal A becomes abnormal at $t=t_1$, the level of the switch control signal $S_1$ changes from low to high (FIG. 4A) and the predetermined detecting operation is carried out by the detecting unit 34 in response thereto. If the gear of the transmission mechanism 4 is set, the clutch is disengaged and the vehicle speed is zero at time $t_1$, the level of the output signal DS becomes high at the time $t_1$ as shown in FIG. 4C.

At the same time, the position selected by the select lever 3a at that time is stored in the memory unit 35 and the content of the position signal SL is compared with that of the output data MD. In this example, since the position of the select lever 3a is not changed from $t_1$ to $t_3$, the level of the output signal CO is maintained at high level during this period (FIG. 4D). Consequently, the level of the output signal $O_1$ of the AND gate 37 becomes high at the time $t_1$, causing the level of the one terminal of the AND gate 38 to become high.

On the other hand, the switch control signal $S_1$ is delayed by the time $\Delta t$ by means of the delay unit 39 and the delay switch control signal $SD_1$ is derived therefrom (FIG. 4B). The inverted signal $\overline{SD_1}$ from the inverter 40 is applied to the OR gate 41. Accordingly, the high level condition of the output signal $O_2$ is maintained at least until time $t_2$, so that the level of the output of the AND gate 38, i.e. the switch control signal $S_2$, becomes high when the level of the output signal $O_1$ is changed to high (FIG. 4F). The high level state of the output signal of the AND gate 38 is returned through the OR gate 41 to the other input terminal of the AND gate 38. Thus, the high level state of the output of the AND gate 38 can be maintained as long as the level of the output signal $O_1$ is high.

When the select lever 3a is manipulated to change its position at time $t_3$, the level of the output signal CO changes from high to low. Accordingly, the level of the output signal $O_1$ also changes similarly (FIG. 4D). As a result, the level of the switch control signal $S_2$ changes from high to low at time $t_3$. Since the level of the inverted signal $\overline{SD_1}$ has already become low at this time, the low level state of the switch control signal $S_2$ is not changed even if the select lever 3a is returned to the former position after that time, for example, at time $t_4$ and the level of the output signal CO is changed to high (FIGS. 4D and 4F).

That is, since the level of the switch control signal $S_2$ changes to high when the level of the output signal DS become high, the second switch 12 is switched over as shown by the broken line in FIG. 1, enabling the second backup acceleration signal $BA_2$ to be derived as the backup acceleration signal BA. As result, even if the actual acceleration signal A becomes abnormal at the time when the gear of the transmission is set and the clutch is disengaged, the vehicle is safe from carrying out the vehicle starting operation in response to the application of the backup acceleration signal since the backup acceleration signal BA produced at this time corresponds to the actual acceleration signal when the amount of operation of the accelerator pedal 2 is zero.

Furthermore, when the selector 3 is manipulated by the driver, the backup condition using the second backup acceleration signal $BA_2$, which is the backup state for when the driver is absent, is canceled and the backup of the system is attained by the use of the first backup acceleration signal $BA_1$. After this, the backup state does not return to the backup state using the second backup acceleration signal $BA_2$ unless the necessary condition is satisfied. Thus, it is possible to carry out the backup operations for starting, running and stopping of the vehicle by the use of the first backup acceleration signal $BA_1$.

In this embodiment, the backup system uses the first and second backup acceleration signals $BA_1$ and $BA_2$. However, if desired, it is, of course, possible to arrange a backup system employing either one of backup acceleration signals $BA_1$ and $BA_2$.

Functions the same as those of the backup acceleration signal generator 100 shown in FIG. 1 can be realized by using a microcomputer in which a predetermined control program is executed. FIG. 5 is a block diagram showing a backup acceleration signal generator 100' constituted differently from, but having functions corresponding to, the backup acceleration signal generator 100. The backup acceleration signal generator 100' comprises an interface circuit 101 receiving the brake signal BK from the brake sensor 17, the switch control signal $S_1$ and the position signal SL. The interface circuit 101 is connected through a bus 102 to a central processing unit (CPU) 103, a random access memory (RAM) 104 and a randomly memory (ROM) 105 in which a control program for performing the same functions as those of the generator 100 is stored. The result of the computation is derived from the interface circuit 101 as the backup acceleration signal BA.

Figure 6A:
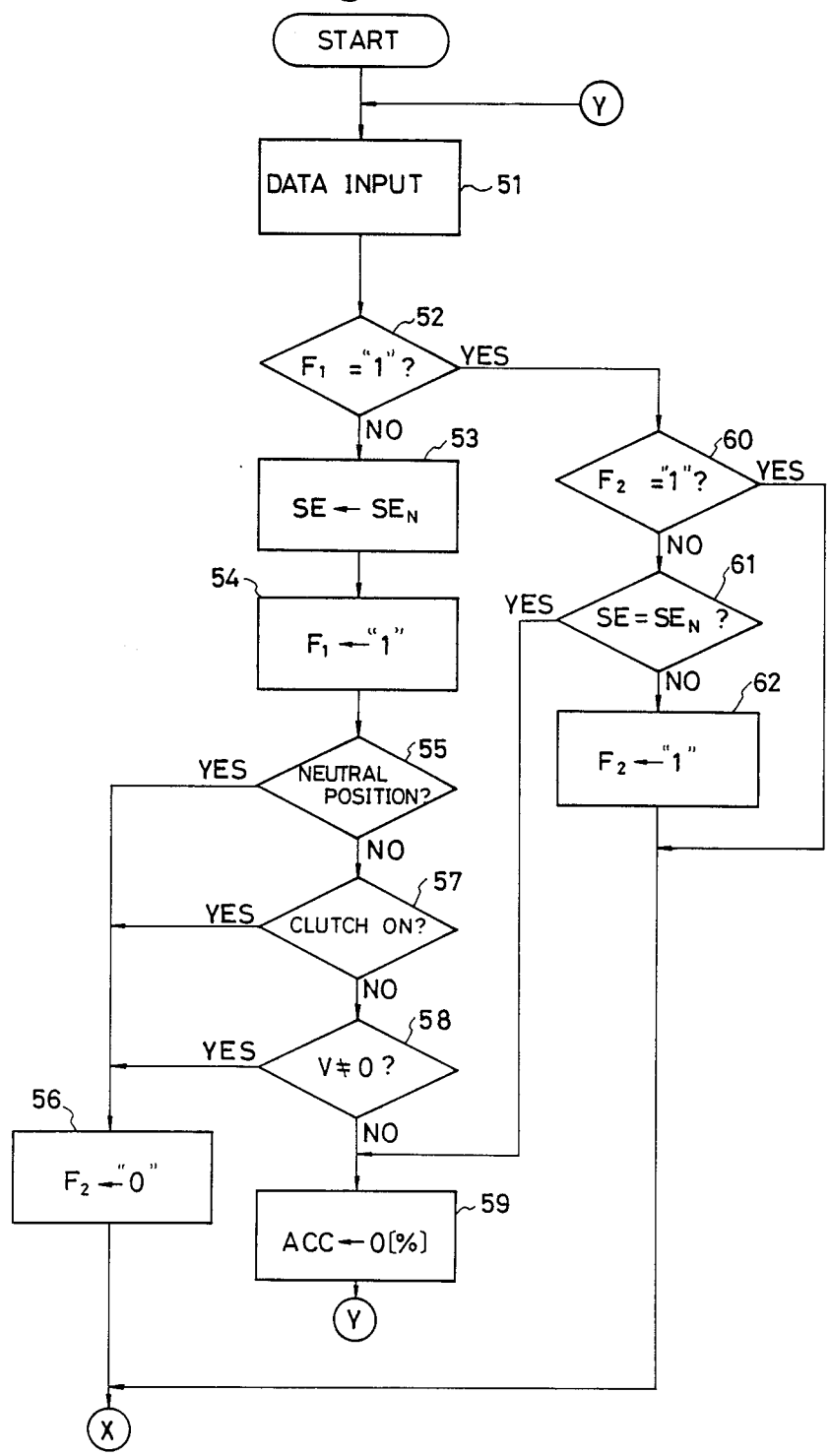
FIGS. 6A and 6B are flowcharts showing a control program executed in the device shown in FIG. 5.
Figure 6B:
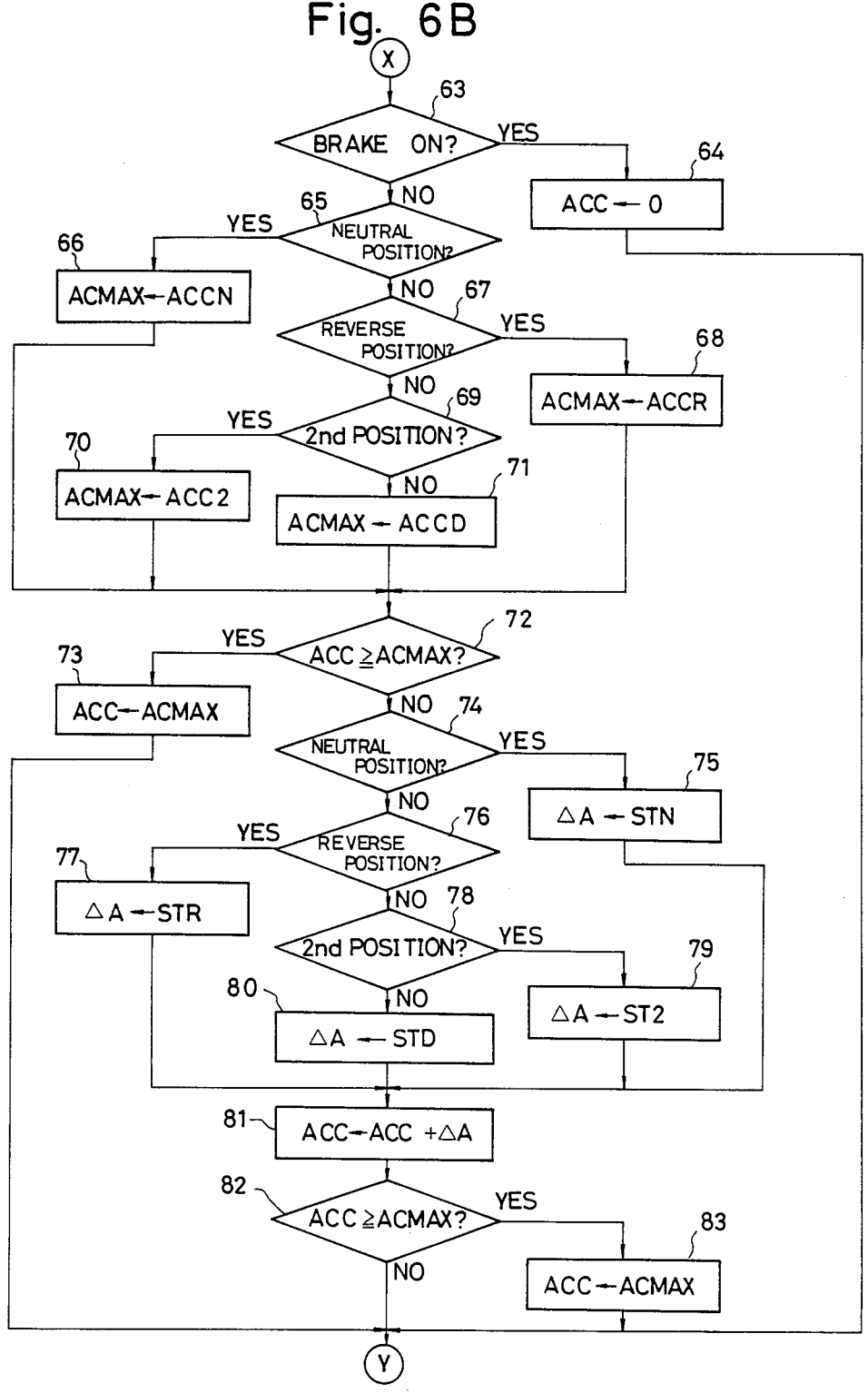

Flowcharts showing the control program stored in the ROM 105 are shown in FIGS. 6A and 6B.

After the start of execution of the program, initialization is carried out and the operation moves to step 51 in which data necessary for the computation is read into and stored in the RAM 104. In step 52, discrimination is made as to whether or not a flag $F_1$ is set. The determination in step 52 becomes NO in the case of the first execution of step 52 after the initialization since the flag $F_1$ is reset by the initialization, and the operation moves to step 53. Data SEN showing the position of the select lever 3a at that time is set as SE in step 53 and the flag $F_1$ is set in step 54.

After this, the operation moves to step 55 in which discrimination is made as to whether or not the transmission is in its neutral position and the operation moves to step 56 in which a flag $F_2$ is reset when the result of the discrimination of step 55 is YES. If the discrimination of step 55 is NO, the operation moves to step 57 in which discrimination is made as to whether or not the clutch is in its engaged or ON condition. The operation moves to step 56 when the discrimination in step 57 is YES, and the operation moves to step 58 when the discrimination in step 57 is NO. Discrimination is made in step 58 as to whether or not the vehicle speed V is zero and the operation moves to step 56 when the vehicle speed is not zero. When the vehicle speed is zero, the discrimination in step 58 becomes NO and the operation moves to step 59, wherein data ACC showing the amount of acceleration for backup is set at zero acceleration state (o [%]). After this, the operation returns to step 51.

In summary, when all of the discriminations in steps 55, 57 and 58 become NO, in other words, when the gear is in a position other than neutral, the clutch is disengaged and the vehicle speed is zero, the content of data ACC is set to correspond to the case where the accelerator pedal is released. Consequently, in this case, the control operation for starting the vehicle is not carried out when the content of data ACC is provided as backup acceleration signal BA to the automatic transmission mechanism 4 instead of the actual acceleration signal A, and the backup operation can be safely performed. As will be understood from the foregoing description, the content of data ACC to be set is not limited to data showing the acceleration amount in the case where the accelerator pedal is released, but may be data showing any acceleration amount insufficient for starting the control operation for starting the vehicle.

In the case where the step 52 is executed again, since the flag $F_1$ has already been set in step 54, the discrimination in step 52 becomes YES and the operation moves to step 60. Discrimination is made in step 60 as to whether or not the flag $F_2$ is set. The discrimination in step 60 becomes NO for the first execution of step 60 and the operation moves to step 61, wherein discrimination is made as to whether or not the present position $SE_N$ of the select lever 3a is coincident with the position shown by data SE. When $SE = SE_N$, the operation moves to step 59.

When the discrimination in step 61 is NO due to, for example, a change in the position of the select lever 3a, the operation moves to step 63 after the execution of step 62 for setting the flag $F_2$. When the discrimination in step 60 is YES or after step 56 is executed, the operation moves to step 63.

Discrimination is made in step 63 as to whether or not braking power is applied to the vehicle by the brake system 16, i.e. whether the brake system is ON. When the result of the discrimination in step 63 is YES, the operation moves to step 64, wherein data ACC is set to zero, which represents no operation of the accelerator pedal, and returns to step 51. This means that the amount of acceleration for backup operation is set to zero.

When the result of the discrimination in step 63 is NO, the operation moves to step 65 wherein discrimination is made as to whether or not the selector 3 is in neutral position. When the result of the discrimination in step 65 is YES, the operation moves to step 66 wherein data ACMAX showing the maximum amount of acceleration for backup operation is set at a fixed amount ACCN. When the result of the discrimination in step 65 is NO, the operation moves to step 67 wherein discrimination is made as to whether or not the selector 3 is in the reverse (R) position. When the discrimination in step 67 is YES, the operation moves to step 68 wherein data ACMAX is set at a fixed amount ACCR. When the result of the discrimination in step 67 is NO, the operation moves to step 69 wherein discrimination is made as to whether or not the selector 3 is in the second (2nd) position. When the discrimination in step 69 is YES, the operation moves to step 70 wherein data ACMAX is set at a fixed amount ACC2. When the selector 3 is in the drive (D) position, the result of the discrimination in step 69 is NO and data ACMAX is set at a fixed amount ACCD in step 71, wherein ACCD < ACC2 < ACCR < ACCN < 0.

As will be understood from the foregoing description, when the brake system 16 is OFF, the content of data ACMAX showing the maximum amount of acceleration for backup operation is determined in one of steps 66, 68, 70 or 71 in accordance with the position of the selector 3 and the operation moves to step 72 thereafter.

In step 72, data ACC showing the acceleration amount for backup operation at that time is compared with data ACMAX showing the maximum amount of acceleration determined as described above, and the operation moves to step 73 when ACC ≧ ACMAX. The content of the data ACMAX is set as the content of data ACC in step 73 and the operation returns to step 51.

When the result of the discrimination in step 72 is NO, the operation moves to step 74 wherein discrimination is made as to whether or not the selector 3 is in the neutral (N) position. When the result of the discrimination in step 74 is YES, the operation moves to step 75 wherein data ΔA showing an increment amount of acceleration for backup operation is set at a value STN. When the result of the discrimination in step 74 is NO, the operation moves to step 76 wherein discrimination is made as to whether or not the selector 3 is in the reverse (R) position. When the result of the discrimination in step 76 is YES, the operation moves to step 77 wherein data ΔA is set at a value STR.

When the result of the discrimination in step 76 is NO, the operation moves to step 78 wherein discrimination is made as to whether or not the selector 3 is in the second (2nd) position. When the result of the discrimination in step 78 is YES, the operation moves to step 79 wherein data ΔA is set at value ST2. When the selector 3 is in the drive (D) position, the result of the discrimination in step 78 becomes NO, and data ΔA is set at a fixed amount STD in step 80. Thus, data ΔA is determined in one of steps 75, 77, 79 and 80 in accordance with the position of the selector 3 and the operation moves to step 81 thereafter.

The sum of ACC and ΔA is set as data ACC in step 81. That is, data ACC is increased by ΔA in step 81 and the operation moves to step 82 wherein discrimination is made as to whether or not ACC ≧ ACMAX. The result of the discrimination in step 82 becomes NO when ACC≦ACMAX and the operation returns to step 51 to repeat the operations described above. Thus, data ACC is increased by ΔA every program cycle and the result of the discrimination in step 82 becomes YES when ACC≧ACMAX. Accordingly, the value of data ACC is replaced by the value of data ACMAX as data ACC in step 83 when ACC≧ACMAX and the operation returns to step 51.

In summary, when the brake system 16 is OFF, the amount of acceleration for backup operation is a fixed value determined in accordance with the position of the selector 3. When the brake system 16 operates so as to change from its ON state to its OFF state, the amount of acceleration for backup operation is changed so as to stepwisely increase from zero to the fixed value determined in accordance with the position selected by the selector 3. In this case, the increment amount shown by data ΔA is determied by the position of the selector 3.

We claim:

1. A system for generating a backup acceleration signal for a vehicle having an automatic transmission controlled in accordance with at least one actual acceleration signal which is a function of an actual amount of acceleration of an accelerating member of said vehicle and the operation of a gear selector, comprising:
   a generating means for generating a backup acceleration signal, said generating means being capable of producing a signal representing a small amount of acceleration which is insufficient for enabling the control operation in said automatic transmission for starting the vehicle;
   a first sensing means for sensing a gear position of the transmission;
   a second sensing means for sensing the engaged/-disengaged condition of the clutch;
   a detecting means responsive to said first and second sensing means for detecting whether or not the gear is in a set condition and the clutch is in a disengaged state;
   a control means responsive to said detecting means for enabling said generating means to produce said backup acceleration signal representing the small amount of acceleration when the gear of said automatic transmission is in a set condition and the clutch in said automatic transmission is in a disengaged state;
   a discriminating means responsive to said actual acceleration signal for determining whether or not the actual acceleration signal is abnormal; and,
   means responsive to said discriminating means for providing said backup acceleration signal to said automatic transmission instead of said actual acceleration signal.

2. A system as claimed in claim 1 wherein said generating means has a first means for producing a first backup acceleration signal, the acceleration amount represented by said first backup acceleration signal being determined in response to a braking condition applied to the vehicle, a second means for producing a second backup acceleration signal representing said small amount of acceleration, and a switching means responsive to said control means for selecting either said first or second backup acceleration signal.

3. A system as claimed in claim 2 wherein said control means further comprises a state detecting means responsive to said gear selector for detecting whether or not said selector has changed after the actual acceleration signal becomes abnormal, and means responsive to said detecting means and state detecting means for producing a control signal for controlling said switching means so as to select said second backup acceleration signal during the period between the time the actual acceleration signal becomes abnormal and the time said selector is initially manipulated.

4. A system as claimed in claim 3 wherein said state detecting means has a memory means responsive to said gear selector for storing an operating position of said gear selector at the time the actual acceleration signal becomes abnormal and means for comparing the content stored in said memory means with the actual position of said gear selector.

5. A system as claimed in claim 2 wherein said first means has a braking sensing means for detecting whether or not a braking power is applied to the vehicle, a first signal generating means for producing a first signal representing an acceleration amount which is insufficient to start the control operation for starting the vehicle when the braking power is applied to the vehicle, a main signal generating means responsive to said braking sensing means for producing a main signal, the amount of acceleration represented by said main signal gradually increasing from a predetermined magnitude by which the control operation for starting the vehicle cannot start to another prescribed magnitude which enables the vehicle to continue its running state after the braking power is removed from the vehicle, and means responsive to said braking sensing means for selectively applying either said first or main signal in accordance with the braking state of the vehicle to said vehicle transmission.

6. A system as claimed in claim 5 wherein the amount of acceleration represented by said main signal increases stepwisely with the passage of time.

7. An apparatus as claimed in claim 6 wherein the step amount for increasing the acceleration shown by said main signal is determined in accordance with the position of said selector.

8. A system as claimed in claim 5 wherein said another prescribed magnitude is determined in accordance with the position of said selector.

9. A system as claimed in claim 2 wherein said first means has a braking sensing means for detecting whether or not a braking power is applied to the vehicle, a first signal generating means for producing a first signal representing an acceleration amount which is too small to enable the control operation for starting the vehicle, a second signal generating means for producing a second signal representing the maximum amount of acceleration for backup, a switch means responsive to said braking sensing means for selecting either said first or second signal, said first signal being selected when the braking power is applied to the vehicle, and said second signal is selected when the braking power is not applied to the vehicle, a third signal generating means responsive to said braking sensing means for producing a third signal whose magnitude gradually increases from a prescribed level by which the control operation for starting the vehicle is disabled after removing braking power from the vehicle, and a selecting means for selecting the smaller level of said third signal and the output from said switch means as said first backup acceleration signal.

10. A system as claimed in claim 9 wherein the second signal representing the maximum amount of acceleration is determined in accordance with the position selected by said selector.

11. A system as claimed in claim 9 wherein the magnitude of said third signal is increased stepwisely with the passage of time.

12. A system as claimed in claim 11 wherein the magnitude of the step for gradually increasing said third signal is determined in accordance with the position of said selector.

13. A system as claimed in claim 9 wherein said third signal generating means has means for producing an initial signal indicating an initial acceleration amount, a switching-over means responsive to said braking sensing means for selecting either the initial signal or the output of said selecting means, wherein the initial signal is selected when the braking power is applied to the vehicle, and the output from said selecting means is selected when the braking power is not applied to the vehicle, a step determining means for determining a step magnitude for stepwisely increasing the magnitude of said third signal, and a calculating means responsive to an output signal of said switching-over means and said step determining means for repetitively carrying out the calculation for increasing the magnitude of the output signal from said switching-over means by the step amount at predetermined time intervals, the result of the calculation by said calculating means being derived as said first backup acceleration signal.

14. A system as claimed in claim 13 wherein said step determining means determines the step magnitude in accordance with the position selected by said selector.

15. A system as claimed in claim 1 wherein said system further comprises a third sensing means for sensing the speed of the vehicle and said generating means is responsive to said third sensing means.

16. A system as claimed in claim 1 wherein said detecting means is rendered operative in response to said discriminating means at the time the actual acceleration signal becomes abnormal.

17. A system for generating a backup acceleration signal for a vehicle having an automatic transmission controlled in accordance with at least one actual acceleration signal representing the actual amount of acceleration of an accelerating member and the operation of a gear selector, comprising:
a braking sensing means for detecting whether or not a braking power is applied to the vehicle;
a first signal generating means for producing a first signal representing an acceleration amount which is insufficient for enabling the control operation in said automatic transmission for starting the vehicle when the braking power is applied to the vehicle;
a main signal generating means responsive to said braking sensing means for producing a main backup acceleration signal, the amount of acceleration represented by said main signal gradually increasing from a predetermined magnitude by which the control operation for starting the vehicle cannot start to a higher magnitude which causes the vehicle to continue running after the braking power is removed from the vehicle;
a selecting means responsive to said braking sensing means for selecting either said first or said main signal as the backup acceleration signal in accordance with the braking state of the vehicle;
a discriminating means responsive to said actual acceleration signal for determining whether or not the actual acceleration signal is abnormal; and,
means responsive to said discriminating means for providing said backup acceleration signal from said selecting means to said automatic transmission instead of said actual acceleration signal.

18. An apparatus as claimed in claim 7 wherein the amount of acceleration represented by said main signal increases stepwisely with the passage of time.

19. A system as claimed in claim 18 wherein the step amount for increasing the acceleration shown by said main signal is determined in accordance with the position of said selector.

20. A system as claimed in claim 18 wherein said higher magnitude is determined in accordance with the position of said selector.

21. A system for generating a backup acceleration signal for a vehicle having an automatic transmission controlled in accordance with at least an actual acceleration signal representing the actual amount of acceleration of an accelerating member and the operation of a gear selector, comprising:
a braking sensing means for detecting whether or not a braking power is applied to the vehicle;
a first signal generating means for producing a first backup signal representing an acceleration amount which is too small to enable a control operation for starting the vehicle;
a second signal generating means for producing a second backup signal representing the maximum amount of acceleration for backup;
a switch means responsive to said braking sensing m®ans for selecting either said first or said second signal, said first signal being selected when the braking power is applied to the vehicle and said second signal being selected when the braking power is not applied to the vehicle;
a third signal generating means responsive to said braking sensing means for producing a third signal whose magnitude gradually increases after removing braking power from the vehicle from a level which disables a control operation for starting the vehicle;
a selecting means for selecting a smaller level signal of said gradually increasing third signal, and the output from said switch means as the backup acceleration signal;
a discriminating means responsive to said actual acceleration signal for determining whether or not the actual acceleration signal is abnormal; and,
means responsive to said discriminating means for providing said backup acceleration signal from said selecting means to said automatic transmission in place of said actual acceleration signal.

22. A system as claimed in claim 21 wherein the maximum amount is determined in accordance with the position selected by a selector for automatic transmission.

23. A system as claimed in claim 21 wherein the magnitude of said third signal is increased stepwisely with the passage of time.

24. A system as claimed in claim 23 wherein the magnitude of the step for gradually increasing said third signal is determined in accordance with the position of a selector for automatic transmission.

25. A system as claimed in claim 21 wherein said third signal generating means has means for producing an initial signal indicating an initial acceleration amount, a switching-over means responsive to said braking sensing means for selecting either the initial signal or a signal from an output of said selecting means, wherein the initial signal is selected when the braking power is applied to the vehicle, and the output signal from said selecting means is selected when the braking power is not applied to the vehicle, a step determining means for determining a step magnitude for stepwisely increasing the magnitude of said third signal, and a calculating means responsive to the output signal of said switching-over means and said step determining means for repetitively carrying out a calculation for increasing the magnitude of the output signal from said switching-over means by the step amount at predetermined time intervals as the backup acceleration signal.

26. A system as claimed in claim 25 wherein said step determining means determines the step magnitude in accordance with the position of a gear selector for said automatic transmission.

* * * * *

UNITED STATES PATENT AND TRADEMARK OFFICE
CERTIFICATE OF CORRECTION

PATENT NO. : 4,862,362
DATED : August 29, 1989
INVENTOR(S) : Kurihara et al.

It is certified that error appears in the above-identified patent and that said Letters Patent is hereby corrected as shown below:

Column 14, line 31, change "m(R)ans" to --means--.

Signed and Sealed this

Thirty-first Day of July, 1990

*Attest:*

HARRY F. MANBECK, JR.

*Attesting Officer*      *Commissioner of Patents and Trademarks*